Aug. 28, 1962  D. E. MYERS ET AL  3,050,872
MAP MAKING AND APPARATUS THEREFOR
Filed April 4, 1960

INVENTORS.
DONALD EVAN MYERS
JOSEPH FRANCIS LIST
JAMES CLIFFORD BOWMAN
BY
ATTORNEY

United States Patent Office
3,050,872
Patented Aug. 28, 1962

3,050,872
MAP MAKING AND APPARATUS THEREFOR
Donald Evan Myers, Horsham, and Joseph Francis List and James Clifford Bowman, Philadelphia, Pa., assignors, by mesne assignments, to Aero Service Incorporated, a corporation of Delaware
Filed Apr. 4, 1960, Ser. No. 19,806
7 Claims. (Cl. 35—40)

This invention relates to maps for radar simulation equipment and other purposes and is especially directed to provision of three-dimensional representations of three-dimensional terrain in which the third dimension, corresponding to relative altitude, is rendered in variations of color or tone density whereby accurate information as to actual altitudes in the simulated terrain may be gathered by use of a radar scope or other scanning or viewing device sensitive to color or tone density.

It has been the practice in the production of maps, particularly for radar simulation in the training of aircraft pilots, to color relatively conventional contour maps with progressively varying colors or color tone densities in the bands included between adjacent pairs of contour lines so that when the contour interval is for example 100' all elements or features of the terrain whose altitudes are within the limits of one such interval appear on the map in the same color or tone density. Reducing the contour interval to afford more accurate altitude information is generally impractical unless the horizontal scale is increased correspondingly, while the capacity of the training apparatus imposes a limit upon the physical size of maps which may be used with it. Training for modern high speed aircraft operation, moreover, requires that as large as possible an area of the terrain be represented in a single map, which militates against the use of maps drawn to relatively large horizontal scales.

The resulting compromises have therefore forced acceptance of maps containing altitude information lacking optimum precision even though in some cases relative altitudes may be of critical importance to the success of a mission. Thus, for example, a pilot trained with existing maps to familiarity with a given target may believe two vital objects depicted as lying between the same pair of 100' interval contour lines are at the same altitude whereas their actual altitudes may differ by as much as just short of 100', while two other objects lying on opposite sides of one such contour line may differ in actual altitude by only a foot or so, or by almost 200', and when the contour interval is greater than 100' such inaccuracies are correspondingly exaggerated.

It is therefore a principal object of this invention to provide a method and apparatus for producing maps or other two-dimensional information carriers in which a third dimension, specifically relative altitude, is represented in shading or color density as disclosed by response to either transmitted or reflected light as preferred.

A further object is to provide novel means for producing a replica of a given terrain in which horizontal dimensions are represented on a usually reduced but uniform linear scale and vertical ones are expressed in terms of relative light-response densities, although not necessarily in linear proportion thereto since any departures from linearity in this respect may be compensated for by the scanning or other apparatus used for observation or recording in other terms the altitude information contained on the map.

Still another object is to provide a map containing altitude information displayed in terms of relatively infinitesimal increments in light response corresponding to increments of altitude of physical features of the terrain or other three-dimensional surface represented on the map.

Other objects, purposes and advantages of the invention will hereafter more fully appear or will be understood from the following description of a preferred practice of it with the aid of apparatus contemplated thereby, one embodiment of which is illustrated in the accompanying drawing, in which.

Figure 1:
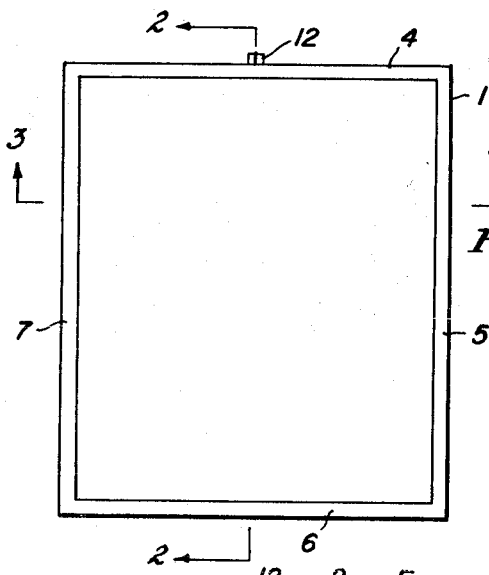
FIG. 1 is a front elevation of a typical map making cell.
Figure 2:
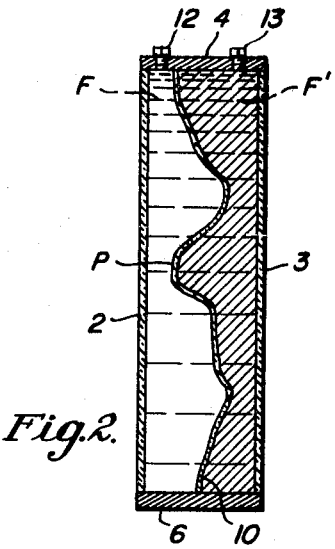
FIG. 2 is a vertical section thereof on line 2—2 in FIG. 1.
Figure 3:
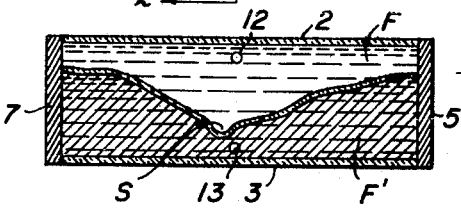
FIG. 3 is a horizontal section on line 3—3 in FIG. 1.
Figure 5:
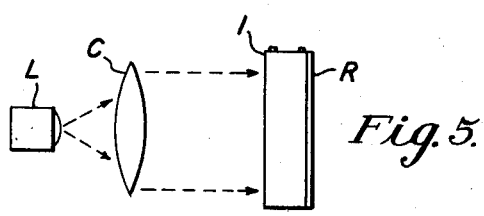
Figure 6:
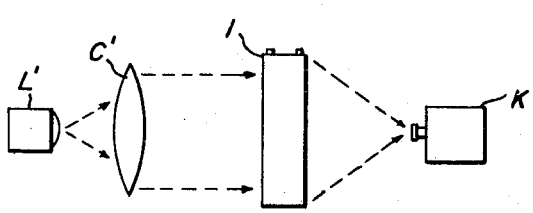
Figure 4:
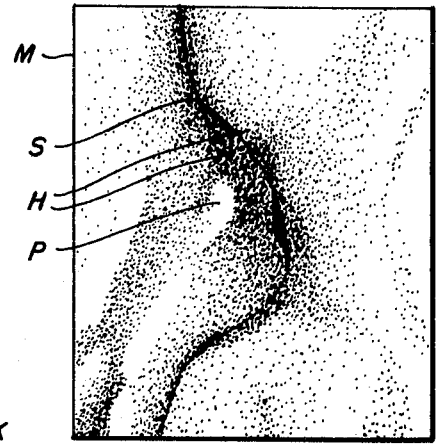
FIG. 4 is a diagrammatic plan view of a map made with the aid of the apparatus shown in the preceding figures.

FIG. 5 is a diagrammatic view of the said apparatus arranged for producing the map of FIG. 4 therefrom by "contact" exposure of a sheet of photosensitive emulsion coated paper or the like, and FIG. 6 is a corresponding view of the apparatus arranged for photographing on sensitized photographic film a negative two-dimensional rendering of the information or topographic data contained in said apparatus in which, as in FIG. 5, the third dimension representing distances or altitudes in the directions normal to the plane of the other dimensions is recorded in terms of relative light responsiveness.

Any relief map constructed solely on the basis of the information contained on a planar contour map the contour interval and horizontal scale of which are known would of necessity represent sloping terrain extending through several contour intervals as a series of steps with the "treads" spaced at vertical distances corresponding to such contour interval, and relief map makers, relying on experience and additional information, normally provide artifically sloping surfaces corresponding to a filling in of the spaces between the edges of such steps in making a mold or the like from which the relief map is to be produced.

Modern aerial surveying affords information which enables the production of relief maps of much greater accuracy than this, although to facilitate their comprehension vertical scales are often exaggerated, but their bulkiness and difficulties connected with handling them and changing them in the viewing apparatus make the use of relief maps for radar simulation training and like purposes relatively impractical.

As the appearance to the naked eye of a map used for these purposes is of relatively little importance provided the scanning or other viewing or reading apparatus be capable of translating to understandable terms the information it contains, it is practical in accordance with the present invention to represent, in a photosensitive emulsion on photographic film, paper or the like, gradations of light responsive tone or density limited only by grain size in the emulsion, and thus in many instances imperceptible to the naked eye, but corresponding to a third dimension and capable of being converted by known instruments to terms comprehensible in another medium on the basis of relatively infinitesimal actual differences as compared with the differences of arbitrary known finite contour intervals, the instrument used for the conversion constituting no part of the invention.

Referring now more particularly to the drawing the apparatus illustrated therein for producing our maps comprises in general a cell 1 formed by front and back spaced parallel preferably rectangular transparent panes 2, 3, the edges of which are sealed to peripheral spacing strips 4, 5, 6, 7 embracing between the panes and in fluid tight relation therewith a relief map 10 made from transparent film the relative thickness of which is exaggerated in the drawing. The map 10 and panes 2, 3 are preferably made from the same material, for example an acrylic resin such as Plexiglas sold by Rohm & Haas Company, of Philadelphia, Pennsylvania, or if made of different materials it is advisable they have the same or closely similar indices of refraction.

The relief map 10 divides the cell into two compartments the opposed faces of which, defined by the map, are complementary and correspond to the contours represented by the map, while their opposite faces, defined by the panes 2, 3, conform to spaced parallel planes. These compartments are accessible from without the cell through ports provided with fluid tight closure plugs 12, 13 which are sent home after the compartments have been filled with fluids F, F', now to be described.

As noted, the compartments are separated and defined in part by the map 10, and when both are filled with fluid having the same color and index of refraction as the map material the latter is substantially imperceptible to the naked eye by either transmitted or reflected light. When the fluid in one compartment is colored, however, as with a suitable transparent dye, but without changing its index of refraction, the presence of the map may be detected from variations in the intensity of light transmitted through the cell caused by differences in the amount of light absorbed by the dyed fluid in correspondence to differences in the thickness of the fluid body produced by the varying contours of map 10. Mineral oil desirably may be used for the fluids F, F' in the cell, being readily available, miscible with known transparent dyes and easily blended to provide an index of refraction closely similar to that of plastic materials suitable for panes 2, 3 and map 10, and it is substantially immaterial which of the fluids F or F', be dyed provided the other be substantially clear and colorless.

The compartments having been filled with the fluids, preferably to the exclusion of all air, and closed by plugs 12, 13, the cell is in condition for photographing, for which it may held by suitable supports either upright or horizontally, and "contact" prints made directly therefrom as by positioning the emulsion side of a sheet of sensitized paper R against one of the panes and exposing it to transmitted light from a suitably positioned light source L, preferably one provided with a collimating lens C to minimize dispersion due to angular incident rays, the procedure of course being carried out in a dark room, or one illuminated generally only by light to which paper R is insensitive.

Instead if preferred, a photographic reproduction of the cell may be made on film by photographing it in a suitably adjusted camera K with transmitted light supplied from a light source L', and collimating lens C', in which case the negative film image may later be reproduced as a positive on photographic paper by ordinary enlargement procedures, resulting in a map the photographic negative of that produced directly on paper by the above described contact method. The map M (FIG. 4) however may be considered as illustrative of a map made by either method, since "positive" and "negative" when used in relation to our maps are substantially interchangeable due to the choice afforded in regard to using dyed fluid in one or the other of the compartments of cell 1.

In the map illustrated, which is not intended to be representative of any known terrain, the density of shading (indicated by stippling due to drafting limitations) is graded from densest at lowest altitudes to least dense at the highest elevations, and thus depicts a stream S flowing through a valley between relatively steep highlands H on either side of it and a peak P nearby. It will be evident from this typical map that the light reflectivity, or transmission if a negative of the same view appears on a negative film corresponding to map M, varies in a determinable, although not necessarily linear, proportion to the altitude of various points on the terrain depicted, as reproduced in relief map 10, and with horizontal dimensions corresponding to their counterparts in that map.

Ordinary photographic emulsions are considerably more sensitive to variations in light density or shading than is the naked eye and it is therefore advisable to use an instrument of corresponding sensitivity to assist in converting the density gradations of the map to linear distances, i.e., altitude; scanning devices used in radar simulation training are well adapted for this but other instruments are available and may be used if preferred.

It will now be apparent from the foregoing that by the practice of our invention a two-dimensional map may be produced having a degree of accuracy directly corresponding to that of the relief map from which it is made, the latter as noted, particularly in relation to altitude data, being of an order considerably higher than can be attained in two-dimensional contour maps having zones or band representing areas between adjacent even very small contour intervals; furthermore, that altitudes represented by several degrees of density of the photographic image may for convenience of interpretation be correlated with the tone altitudes on the terrain by references to check points.

Moreover, while we prefer to make panes 2, 3 and relief map 10 of Plexiglas or a generally similar transparent acrylic resin, which resins as a class have refraction indices in the neighborhood of 1.4885, and to use with it mineral oil having inherently, or blended to, the same index, other materials can of course be employed provided the panes, relief map and fluids be substantially transparent and have identical or closely corresponding refraction indices, since significant differences in the latter respect tend to impair the accuracy of the ultimate photographic map through refraction of light rays passing through the cell.

Our photographic relief map is thus in effect equivalent to a three-dimensional one but with horizontal dimensions linearly scaled in the usual way to actual dimensions of the terrain and vertical ones, i.e., altitudes, represented by gradations in density of light responsiveness in the photographic image of the light pattern formed by the cell on transmission of collimated light through it, the intensity of each ray of transmitted light being determined by the length of its path through the dyed fluid which in turn corresponds to the distance from an arbitrary horizontal plane or flat base of a point on the terrain.

It is consequently immaterial, as has been indicated, whether the dyed fluid be in the cell compartment corresponding to that part of the earth the surface of which is represented by the relief map or in that corresponding to space above the relief terrain, as reversal of the significance of the density gradations can readily be made by ordinary techniques of making positive and negative photographic prints or otherwise compensated for in the reading instrument.

We have so far described the cell contemplated by our invention as one comprising an acrylic sheet relief map dividing a chamber having opposed parallel plane faces into compartments for reception of relatively non-solidifying fluids, but it will be understood we do not thereby intend to exclude employment of fluids which after introduction to the compartments may become solids or semisolids through temperature change, chemical action or other cause; we further contemplate as an available practice for manufacture of a cell suitable for use in accordance with the invention a relief map or complement thereof rendered as a three-dimensional transparent solid on a plane base, preferably corresponding to a horizontal plane related to the terrain represented, with the space between the relief surface and another plane parallel to said base occupied by a transparent fluid, semi-solid or solid complement of the first solid. Hence it is essential only that the cell provide between parallel planes transparent bodies of different degrees of light transmissivity but substantially like refractive indices defined from each other by a surface having the contours of the terrain or other area to be depicted in a two-dimensional photographic image; therefore while we presently prefer to use a sheet of finite thickness to define the boundaries between the bodies of different light transmissivity and to form the latter primarily by the use of fluids confined between parallel transparent panes likewise of finite thickness, we may also in effect reduce the sheet and panes to mere surfaces devoid of finite thickness by utilizing complementary bodies of corresponding contours thus rendering the contour-defining sheet and/or fluid-confining panes unnecessary. Consequently the terms sheet and pane as used herein are to be construed as including surfaces formed on fluid, semi-solid or solid bodies defining, in the case of a sheet, one of non-planar contour and in the case of a pane a surface having two dimensions only and thus corresponding substantially to a geometrical plane.

It will further be understood that while we have herein described the practice of our invention with considerable particularity and especially in respect to its potentialities as an adjunct of radar simulation in the training of aircraft operating personnel, we do not desire or intend to be limited or confined thereto or thereby in any way as the field of use of the maps produced constitutes no part of the invention; moreover the specific steps described for making them, the apparatus illustrated for use in connection therewith and the character of the maps themselves as disclosed are to be considered as exemplary only and hence that changes and modifications herein suggested and others which will readily occur to those skilled in the art may be made if desired without departing from the spirit and scope of the invention as defined in the appended claims.

Having thus described our invention, we claim and desire to protect by Letters Patent of the United States:

1. A cell for production of a two-dimensional map providing information as to a third dimension in terms of relative light density comprising a complementary pair of transparent bodies extending between spaced parallel planes and defined from each other by a surface, points on which are spaced from one of said planes distances corresponding to said third dimension, the bodies having substantially identical indices of refraction but different light transmission characterstics, one of said bodies transmitting light normal to said plane substantially unimpeded and the other transmitting it substantially in inverse proportion to the distances of said points, respectively, from said plane.

2. A cell as set forth in claim 1 in which a relatively thin light permeable sheet deformed to coincide with said points divides said bodies from each other.

3. A cell as set forth in claim 1 in which said bodies comprise fluids defined from each other by a transparent sheet deformed congruently to and defining said surface and the fluids are confined respectively between said sheet and spaced parallel transparent panes substantially coincident with said parallel planes.

4. A cell for making a photographic image having variations in light density response comprising spaced parallel transparent panes, a transparent sheet having portions displaced laterally from its general plane interposed between said panes generally parallel thereto, and means defining with said panes and sheet compartments on opposite sides of the sheet, one compartment confining a medium transmissive to light in inverse proportion to its thickness and the other being substantially uniformly light transmissive irrespective of thickness, the indices of refraction of the contents of the compartments being substantially identical and equal to that of the sheet.

5. A cell as defined in claim 4 in which the panes. said medium and the sheet have substantially identical indices of refraction.

6. A cell as defined in claim 4 in which the compartments are substantially wholly occupied by fluids, one of which is transmissive of light substantially without diminution and the other of which is transmissive thereof substantially in inverse proportion to the length of the light path through the fluid.

7. A cell as defined in claim 6 in which the fluids have substantially identical indices of refraction substantially equal to that of the panes and sheet.

References Cited in the file of this patent

UNITED STATES PATENTS

| | | |
|---|---|---|
| 1,113,610 | Gilmore | Oct. 13, 1914 |
| 2,039,412 | Heise | May 5, 1936 |
| 2,183,426 | Hart | Dec. 12, 1939 |
| 2,394,282 | Withers | Feb. 5, 1946 |
| 2,430,277 | Cooke | Nov. 4, 1947 |
| 2,537,329 | Campbell | Jan. 9, 1951 |
| 2,556,798 | Concordet | June 12, 1951 |
| 2,685,749 | Davenport | Aug. 10, 1954 |
| 2,873,545 | Noel | Feb. 17, 1959 |